United States Patent
Takei et al.

[11] Patent Number: 5,841,456
[45] Date of Patent: *Nov. 24, 1998

[54] TRANSFER PRINTING APPARATUS WITH DISPERSION MEDIUM REMOVAL MEMBER

[75] Inventors: Katsumori Takei; Tsuyoshi Kitahara; Takahiro Katakura; Toshihisa Saruta; Toshio Kumagai; Tohru Fukushima, all of Suwa, Japan

[73] Assignee: Seiko Epson Corporation, Tokyo, Japan

[*] Notice: The term of this patent shall not extend beyond the expiration date of Pat. No. 5,365,261.

[21] Appl. No.: 932,699

[22] Filed: Aug. 20, 1992

[30] Foreign Application Priority Data

| Aug. 23, 1991 | [JP] | Japan | 3-212082 |
| Sep. 12, 1991 | [JP] | Japan | 3-233403 |
| Nov. 26, 1991 | [JP] | Japan | 3-336149 |
| Jul. 8, 1992 | [JP] | Japan | 4-206026 |

[51] Int. Cl.$^6$ ............. B41T 2/01; G03G 15/10
[52] U.S. Cl. ............. 347/103; 399/249; 347/101
[58] Field of Search ............. 346/25, 21, 140 R; 355/273, 256–258, 261; 430/119, 125; 347/103, 55, 101, 104; 118/659; 399/249, 250, 237, 296, 297, 348

[56] References Cited

U.S. PATENT DOCUMENTS

| 3,790,703 | 2/1974 | Carley | 347/100 X |
| 3,834,301 | 9/1974 | Croquelois | 347/55 |
| 3,898,670 | 8/1975 | Erikson et al. | 347/103 X |
| 4,263,391 | 4/1981 | Saito et al. | 430/125 |
| 4,286,039 | 8/1981 | Landa et al. | 430/119 |
| 4,293,866 | 10/1981 | Takita et al. | 347/103 |
| 4,400,079 | 8/1983 | Landa | 399/249 X |
| 4,522,484 | 6/1985 | Landa | 399/130 |
| 4,538,156 | 8/1985 | Durkee et al. | 347/103 X |
| 4,613,877 | 9/1986 | Spencer et al. | 347/133 |
| 4,967,207 | 10/1990 | Ruder | 347/7 |
| 5,099,256 | 3/1992 | Anderson | 347/103 |
| 5,148,222 | 9/1992 | Liar et al. | 399/233 |
| 5,187,501 | 2/1993 | Lewicki, Jr. et al. | 347/112 |
| 5,332,642 | 7/1994 | Simms et al. | 430/125 |
| 5,365,261 | 11/1994 | Ozawa et al. | 347/103 |

FOREIGN PATENT DOCUMENTS

| 2206082 | 12/1988 | European Pat. Off. . |
| 0437612 | 7/1991 | European Pat. Off. . |
| 0488359 | 6/1992 | European Pat. Off. . |
| 55-79163 | 6/1980 | Japan . |
| 57-123065 | 7/1982 | Japan . |
| 60-76343 | 4/1985 | Japan . |
| 62-092849 | 4/1987 | Japan . |
| 62-92849 | 4/1987 | Japan . |
| 63-111070 | 5/1988 | Japan . |
| 63-140281 | 6/1988 | Japan . |
| 2136242 | 5/1990 | Japan . |
| 2215534 | 8/1990 | Japan . |
| 3169634 | 7/1991 | Japan . |
| 3190741 | 8/1991 | Japan . |

OTHER PUBLICATIONS

*Standard Handbook for Electrical Engineers,* McGraw–Hill, 1969, section 4–293.

White, Frank M., *Fluid Mechanics,* McGraw–Hill, 1986, pp. 30–33.

*Primary Examiner*—David F. Yockey
*Attorney, Agent, or Firm*—Sughrue, Mion, Zinn, Macpeak & Seas, PLLC

[57] ABSTRACT

A transfer printing apparatus in which a recording image is written by ink drops ejected from an ink jet recording head onto a transfer drum. The ejected ink includes a dispersion medium and coloring material. The apparatus includes a dispersion absorbing member which absorbs the dispersion medium of the ink from the drum without removing the coloring material and which does not contact the transfer medium. The absorption is provided by an absorbing material, by a blower which provides suction, or a combination of both.

14 Claims, 6 Drawing Sheets

TRANSFER PRINTING APPARATUS WITH DISPERSION MEDIUM REMOVAL MEMBER

BACKGROUND OF THE INVENTION

1. (Field of the Invention)

The present invention relates to a printing apparatus of the type in which ink written into a transfer medium is condensed and transferred onto a recording medium.

2. (Description of the Related Art)

An ink jet printer of the type in which a recording image is written by ejecting ink drops onto recording paper by using pressure applied mechanically, or by using pressure based on bubbles generated, is desirable in that it is mechanically simple and quiet in operation. However, the printing quality of such a printer may be poor because the ink may become blurred if the quality of paper is unsuitable. Also, an ink image printed on a sheet of recording paper by this type of printer may be smeared by contact with other sheets of recording paper because the ink does not dry quickly.

To cope with the above-mentioned problems, an apparatus has been proposed, by the Applicant, in Japanese Patent Unexamined Publication No. Sho. 62-92849. The proposed apparatus is based on a transfer printer disclosed in U.S. Pat. No. 4,538,156 and has is advantageous in that ink drops are ejected onto a transfer medium and dried while still on the transfer medium to remove the greater part of water from the ink drops before the condensed ink is transferred to a sheet of recording paper.

The proposed printing apparatus is desirable in that the aforementioned problems of conventional ink jet printers are eliminated. Also, a very sharp image can be formed. However, the proposed printing apparatus requires a relatively long time for condensing the ink and, therefore, high-speed printing cannot be accomplished.

SUMMARY OF THE INVENTION

The present invention provides a solution to the aforementioned problems and it is an object thereof to provide a printing apparatus in which ink to be transferred from a transfer medium onto a sheet of recording paper can be condensed efficiently in a short period of time.

Therefore, according to the present invention, a recording image transfer medium having the characteristic of absorbing a coloring material dispersion medium of the ink is used. Accordingly, the coloring material dispersion medium is absorbed and quickly removed from ink deposited on the recording image transfer medium before a recording image is transferred from a transfer medium to a recording medium.

A material which swells at a low temperature range when it absorbs water and which contracts at a high temperature range as it releases water, through phase transition, can be used as a specific recording image transfer medium according to the present invention. With respect to ink using a petroleum solvent, a material which swells when it absorbs the solvent is used.

Also, according to the present invention, a material which absorbs the dispersion medium contained in ink may be provided in proximity to the recording image transfer medium.

Further, according to the present invention, an electrostatic absorption device for absorbing the coloring material dispersion medium may be used so that the dispersion medium is electrostatically absorbed and removed from liquid ink written on the recording image transfer medium.

DESCRIPTION OF THE PREFERRED EMBODIMENTS

Figure 1:
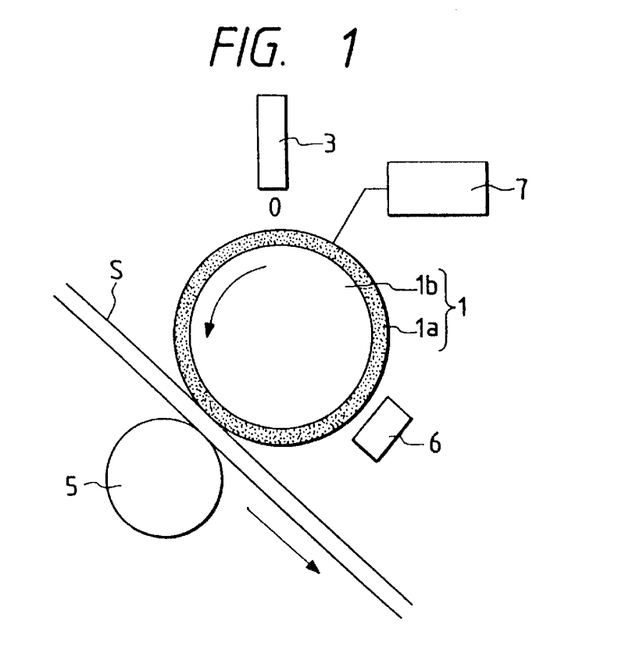
FIG. 1 illustrates a first embodiment of the present invention.

FIG. 1 illustrates a first embodiment of the present invention in which water-soluble ink is used.

A transfer drum 1 serves as a recording image transfer medium and is rotationally driven by a moving unit 7 through a ring gear provided at one end of the apparatus but not shown. A recording head 3 serves as a recording image writing device and a fixing roller 5 serves as a recording image fixing device. A cleaning unit 6 which serves as a transfer medium refreshing device is also provided proximate transfer drum 1. The recording head 3, the fixing roller 5 and the cleaning unit 6 are provided around the transfer drum 1 so as to be successively arranged in order along the direction of rotation of the transfer drum 1 which is indicated by the arrow.

The ink utilized in the printing apparatus of the first embodiment consists of water and a water-insoluble coloring material. More specifically, the ink is a water-dispersion fluid which utilizes water as a dispersion medium having a coloring material, in the form of fine particles, dispersed therein. If necessary, a water-soluble organic solvent, a water-soluble or water-insoluble resin, a wax, a surface active agent, or the like, may be added to the ink.

Examples of the water-soluble organic solvent used herein include alcohols such as ethyl alcohol, propyl alcohol, etc., and glycols such as ethylene glycol, diethylene glycol, glyceline, etc. Examples of the resin used herein include water-soluble polymers and water-insoluble polymers, specifically, polyvinyl alcohol, polyvinyl pyrolidone, polyethylene glycol, etc. Examples of water-insoluble polymer added in the form of fine particles include acrylic ester, methacrylic ester, styreneacrylic acid copolymers, paraffin wax, polyethylene wax, etc.

On the other hand, examples of the coloring material used herein include carbon black, various kinds of pigments, pigments processed by surface treatment with resin or the like, macromolecular fine particles colored by dyes or pigments, etc. It is preferable that the mean particle size of fine particles is in the range of 0.01 to 30 µm and that the percentage thereof is from 1 to 30% by weight. It is desirable to adjust the proportions of ink components so that the viscosity of the ink at 25° C. is from 1 to 30 cps (centipoise).

The recording head 3 deposits liquid ink onto the surface of the transfer drum 1 to form dots thereon. The recording head 3 of the first embodiment includes an ink jet recording head in which pressure is applied to the ink by an electro-mechanical conversion element so as to eject an ink drop from a nozzle provided in the recording head 3 and deposit the ink drop on the transfer drum 1. In the alternative, an ink jet recording head in which bubbles are generated in the ink by using an electrothermal conversion element to eject an ink drop to the transfer drum 1 by the pressure of the bubbles may be utilized.

The transfer drum 1 selectively absorbs and filters water, or an aqueous solution, in the ink deposited on the surface thereof, so as to leave the coloring material on the surface thereof and thereby allow the coloring material to be transferred onto the surface of the recording medium S. The transfer drum 1 may be constructed so that a water aborbing layer is interposed between a filter and a cylindrical support.

The transfer drum 1 filters water or an aqueous solution by a capillary action obtained by laminating a water absorbing layer 1a on a surface of a cylindrical support 1b or by using a filter and a suction and decreasing pressure device in combination. Examples of a material for the water absorbing layer 1a used herein include a material having a high water-absorbing property and being in the form of a film or a fiber, such as poly(sodium acrylate), poly(potassium acrylate), acrylic acid-vinyl alcohol copolymer, modified polyethylene oxide, sodium carboxymethylcellulose, etc. With respect to the filter used herein, it is necessary that the mesh size of the filter is smaller than the particle size of the solid component of ink. Accordingly, examples of materials suitable for the filter include nonwoven fabric such as fluororesin, cellulose, etc., and metal mesh filters such as stainless steel, etc.

To enhance the transferring property of the transfer drum 1, the cylindrical support 1b is preferably formed from an elastic material so as to facilitate firm contact between the transfer drum 1 and the fixing roller 5. Accordingly, examples of the material suitable for the cylindrical support 1b include NR natural rubber, SBR, NBR, nitryl rubber, CR chloroprene, HR butyl rubber, EPDM ethylenepropylene rubber, polyethylene chlorosulfonate, silicone rubber, fluororubber, urethane rubber, etc.

To transfer ink from the transfer drum 1 to the recording medium S, the fixing roller 5 is disposed in opposition to the transfer drum 1 so that the transfer drum 1 is brought into close contact with the recording medium S by the mechanical pressure of the fixing roller 5.

To allow repeated use of the transfer drum 1, the cleaning unit 6 and a drying unit (not shown) are arranged in the downstream side of the transfer portion in order to recover the water or aqueous solution absorbed by the water absorbing layer 1a in a known manner.

As an example, ink formed by dispersing a carbon black particles, 1.0 µm in diameter, and styrene-acrylic acid copolymer particles 0.7 µm in diameter, in water to adjust the viscosity of the ink to 12 cps at 25° C. was used. The ink was ejected as an ink drop of 0.15 µg from a 50 µm-diameter nozzle at an initial speed of 8 m/sec, so that the ink drop was deposited on a transfer drum 1 which was formed by adhering a stainless steel filter of 0.3 µm mesh size and a water absorbing layer to a cylindrical support 1b made from urethan rubber. The water absorbing layer was disposed between the filter and the cylindrical support. Then, the ink was transferred onto a sheet of recording paper (Beck's smoothness: 30 sec), for example, XEROX4024 from XEROX Corp., under a linear pressure of 10 kg/cm. As a result, an ink dot, which was free from blurring and blotting, and which was nearly a 120 µm-diameter perfect circle was formed on the sheet of recording paper, so that an image with the optical density of 1.7 of solid printing was formed. The optical density is generally directed to a diffuse reflection density, and a reflection density $D_r$ is represented by $\log_{10}(1/R)$ wherein R is a reflectivity coefficient, and can be measured by a known density meter. This was so because the water in the ink was absorbed into the water absorbing layer while the color particles remained on top of the filter. In this example, a cleaning unit capable of sucking untransferred solution on the surface of the water absorbing layer 1a, or inside thereof, by air was utilized to re-initialize the water absorbing layer 1a for a subsequent transfer operation.

Figure 2:
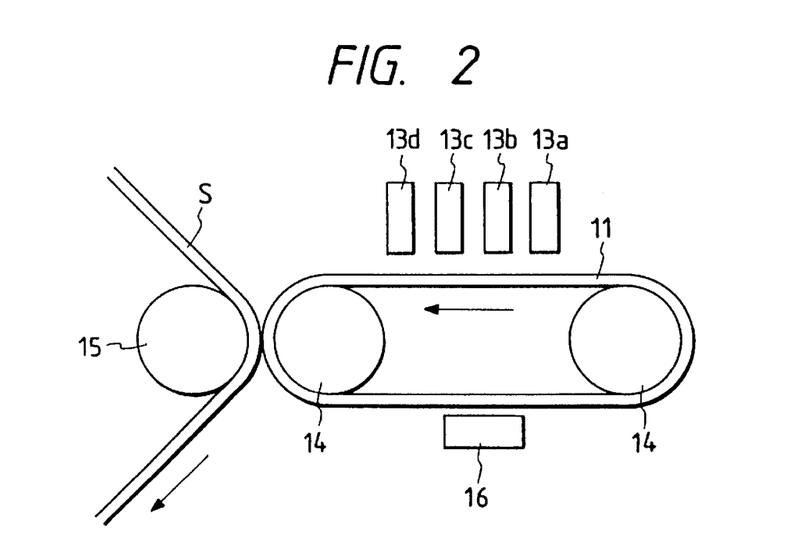
FIG. 2 illustrates a second embodiment of the present invention.

FIG. 2 illustrates a second embodiment of the present invention which is utilized to color printing.

In the printing apparatus of the second embodiment, a transfer belt 11 having a cellulose filter, of 0.3 µm mesh size, on top of a water absorbing layer is used as a transfer medium. The transfer belt 11 is stretched between a pair of feed pulleys 14, 14. Line type bubble jet ink recording heads 13a to 13d for ejecting liquid ink in black, yellow, magenta and cyan respectively are arranged around the transfer belt 11. Further, a fixing roller 15 and a cleaning unit 16 are successively arranged in the downstream side of the recording heads 13a to 13d.

As an example, using the printing apparatus, of the second embodiment, a color image was fixed by pressing the recording medium S to the transfer belt 11 under a linear pressure of 5 kg/m after successively depositing the ink in black, yellow, magenta and cyan onto the transfer belt 11. As a result, a high-quality color recording image being free from mixing of adjacent different color dots or uneven mixing of superposed dots was obtained because the water in the ink was absorbed into the absorbing layer and not transferred to the recording medium.

Figure 3:
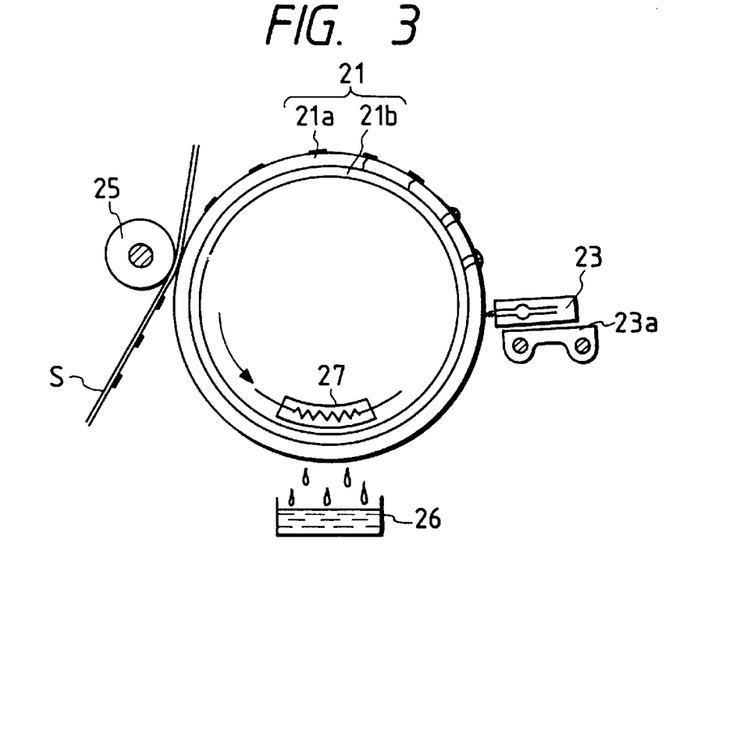
FIG. 3 illustrates a third embodiment of the present invention.
Figure 4:
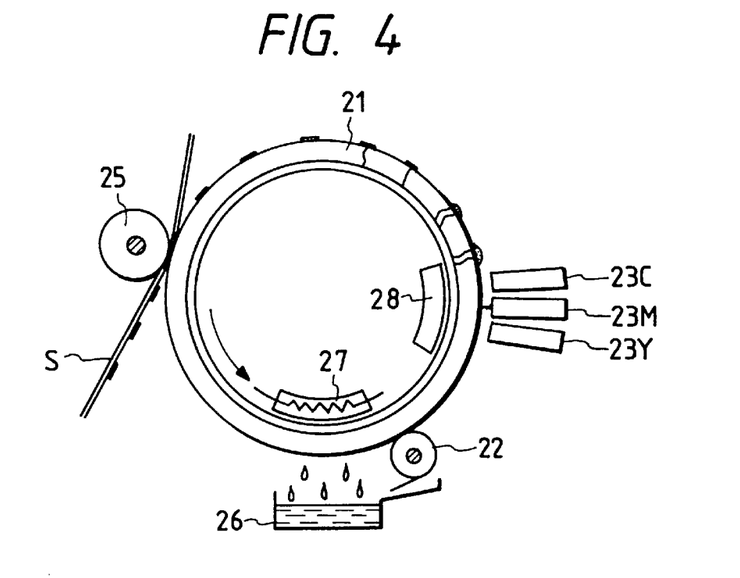
FIG. 4 illustrates a fourth embodiment of the present invention.

FIGS. 3 and 4 illustrate third and fourth embodiments, respectively, of the present invention. These embodiments utilize an aqueous ink.

In the third embodiment, a polymer layer 21a, having a high water-absorbing property, which swells at low temperatures when it absorbs water from ink, and which contracts at high temperatures, as the absorbed water is released, when it is heated to the phase-transition temperature or higher, is utilized on a transfer drum 21. More specifically, a transfer drum 21 has a layer 21a of a highly water-absorbing polymer such as an N-substitution acrylamide polymer, partially saponified poly(vinyl acetate) or poly (vinyl methyl ether) capable of contracting by phase transition based on heating, as disclosed in Japanese Patent Unexamined Publication No. Sho-63-140281, laminated on a surface of a cylindrical support 21b.

The transfer drum 21 is formed as a hollow drum, in which a heater 27 for heating the highly water-absorbing polymer layer 21a to the phase-transition temperature, or higher, is arranged in a portion opposite to a solvent recovering tank 26. If necessary, a cleaner 22 for removing residual ink after transfer may be provided in on the downstream side of the solvent recovering tank 26 as shown the fourth embodiment illustrated in FIG. 4.

A single line recording head or a recording head 23, which is carried on a carriage 23a as shown in FIG. 3, so as to move transversely may be utilized. To form a color image, a plurality of line recording heads 23C, 23M and 23Y for ejecting different color ink drops may be used as shown in FIG. 4, which illustrates the fourth embodiment. In the device of FIG. 4, a cooler 28, such as a thermoelectric coupled cooler, which improves, the water absorbing characteristic of the highly water-absorbing polymer, may be utilized to thereby avoid mixing of colored inks ejected from the recording heads. Cooler 28 is provided on the inside of the transfer drum 21 in opposition to the recording heads.

In both the third and fourth embodiments, the highly water-absorbing polymer layer 21a, acting as the surface of the transfer drum 21, absorbs water from ink drops quickly after the ink drops are ejected from the recording head 23 (or recording heads 23c, 23m and 23y), so that the ink drops are condensed while the pigments (or resins) in ink are left on the surface. The condensed ink drops are subsequently transferred to the surface of the recording medium S which is pressed against the transfer drum 21 by the fixing roller 25.

On the other hand, when the highly water-absorbing polymer layer 21a, which has swelled after absorbing the water, reaches the high temperature area, that is, the area proximate the heater 27, by the continuous rotation of the transfer drum 21, the highly water-absorbing polymer is subjected to phase transition by being heated and contracts as the absorbed water is released from the polymer to the solvent recovering tank 26. As a result, the polymer recovers its water absorbing function and then returns to a position proximate the recording head 23 by virtue of continued rotation of the transfer drum 21.

Figure 5:
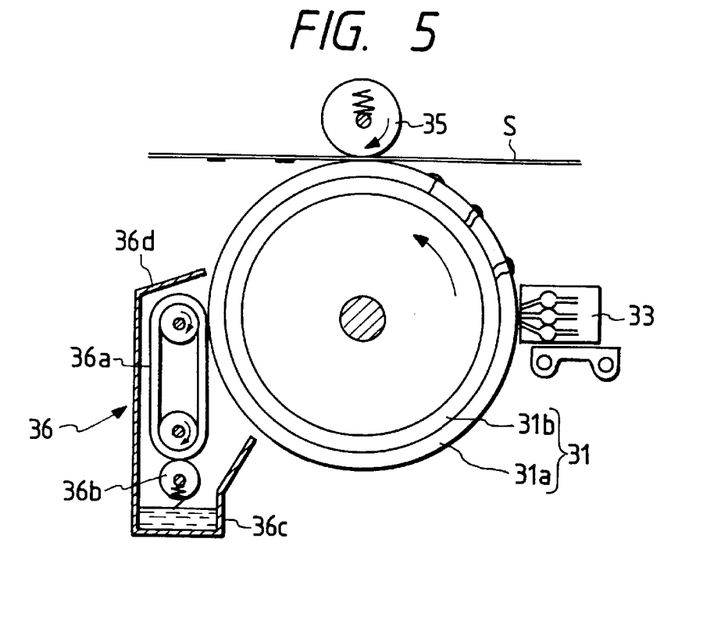
FIG. 5 illustrates a fifth embodiment of the present invention.

FIG. 5 illustrates a fifth embodiment of the present invention which utilizes a solvent ink formed by dispersing pigment and oil-soluble resin in an oil solvent. The ink utilized in the fifth embodiment is an oil solvent-dispersion fluid which includes an oil solvent as a dispersion medium and coloring material, which is not soluble in the oil solvent, dispersed as particles in the solvent. If necessary, oil-soluble or oil-insoluble resin, wax, a surface active agent or the like may be added to the ink.

Examples of the coloring material used herein include carbon black, various kinds or pigments, pigments processed by surface treatment with resin, or the like, macromolecular fine particles colored by dyes or pigments, etc. It is preferable that the mean particle size of fine particles is in a range of from 0.01 to 30 $\mu$m, in diameter, and that the percentage thereof is from 1 to 30% by weight.

As an example of the oil solvent used herein, aliphatic hydrocarbons, aromatic hydrocarbons, alcohols, esters, ethers, ketones, glycol ethers, etc., or a mixture thereof, may be utilized. Specifically, the examples of the oil solvent include ISOPAR G, ISOPAR L, ISOPAR M, EXXOL D80, EXXOL D110 of EXXON Chemical Japan Ltd.; SOLVESSO 150 and SHELLSOL 71 etc. of SHELL Japan Ltd. Examples of the resin and wax include polyvinyl alcohol, polyvinyl pyrolidone, polyethylene glycol, acrylic ester, methacrylic ester, styrene, styrene-acrylic acid copolymer, paraffin wax, polyethylene wax, oxide wax, synthetic wax, etc. The proportion of the components, by weight, in the ink is adjusted so that the viscosity of ink is preferably from 1 to 30 cps at 25° C.

The recording head 33 utilized in the fifth embodiment, is the type of recording head described in U.S. Pat. No. 3,790,703, that is, a recording head which heats the viscous ink, in response to a recording signal, by a heater provided at a top end of the nozzle to thereby weaken the viscosity before ejection.

In this embodiment, porous polytetrafluoroethylene, having a smaller mesh size than the diameter of the pigment particles, is used as an oil absorbing layer 31a of a transfer drum 31 for selectively absorbing and filtering an oil solvent or an oil-soluble solvent to transfer a coloring material to a recording medium S. Other examples of the material used for the oil absorbing layer 31a include filters of nonwoven fabric such as fluororesin, cellulose, etc., and mesh filters or metals such as stainless steel in combination with an absorbent layer. In the case where the solvent has no electrical polarity, the material for the oil absorbing layer 31a is selected from silicone resin, fluororesin, polyethylene, polystyrene, etc. In the case where the solvent has a polarity, the material for the oil absorbing layer 31a is selected from cellulose derivatives, polyvinyl alcohol, etc. Furthermore, these oil absorbing materials may be used after three-dimensional cross-linking so that durability can be improved.

To improve the transferring characteristic of the transfer drum 31, it is preferable that the oil absorbing layer 31a is provided on an elastic support 31b behind oil absorbing layer 31a. A recovering unit 36 for recovering solvent which has infiltrated into the transfer drum 31 is provided proximate the transfer drum 31 on the downstream side of a fixing roller 35.

The recovering unit 36 has a solvent recovery belt 36a placed in rotating contact with the transfer drum 31, a squeeze roller 36b in rotating contact with the solvent recovery belt 36a so as to squeeze a solvent from the solvent recovery belt 36a, a solvent recovery tank 36c, and a cover 36d to prevent solvent vapor from leaking out. Solvent is transferred from transfer drum 31 to recovery belt 36a because the absorbency of recovery belt 36a is substantially larger than that of the oil absorbing layer 31a.

In the fifth embodiment, the solvent component of ink is absorbed into the oil absorbing layer 31a made of porous polytetrafluoroethylene, soon after the ink is ejected onto the transfer drum 31, so that the ink is condensed. The condensed ink is then pressed against the recording medium S by the fixing roller 35, so that the ink is transferred to the recording medium S. The solvent absorbed by the oil absorbing layer 31a is recovered by the solvent recovery belt 36a while in rotating contact with the transfer drum 31 at the downstream side of the transfer portion, so that the absorbing characteristic of the oil absorbing layer 31a is recovered.

As an example, ink formed by uniformly dispersing carbon black particles of 0.5 $\mu$m particle size and cross-linked polystyrene fine particles of 0.5 $\mu$m particle size in ISOPAR L of EXXON Chemical Japan Ltd. to adjust the viscosity of ink to 6 cps at 25° C. was used. The ink was ejected as an ink drop of 0.6 $\mu$g from a 55 $\mu$m-diameter nozzle at an initial speed of 5 m/sec, so that the ink drop was deposited on an oil absorbing layer 31a, formed by disposing a stainless steel filter of 0.2 $\mu$m mesh size on an oil absorbing layer. Cylindrical support 31b was made from urethane rubber. Then, the ink was transferred to a sheet of recording paper (Beck's smoothness: 30 sec), for example, XEROX4024 made by XEROX Corp., under a linear pressure of 12 kg/cm. As a result, an ink dot which was free from blurring and blotting and which was a nearly 120 $\mu$m-diameter perfect circle was formed on the sheet of recording paper.

This embodiment has an advantage in that the absorbing characteristic of the transfer drum 31 can be recovered without the use of a heat source. The solvent recovering unit 36 not only recovers the absorbed solvent but also maintains a constant moisture level of the oil absorbing layer 31a. Accordingly, the penetrating speed of the solvent can be controlled and irregularities in the transfer can be eliminated. Furthermore, the solvent recovering unit 36 imparts moisture to the transfer drum 31 which tends to be dry at the starting-up of the device.

Figure 6:
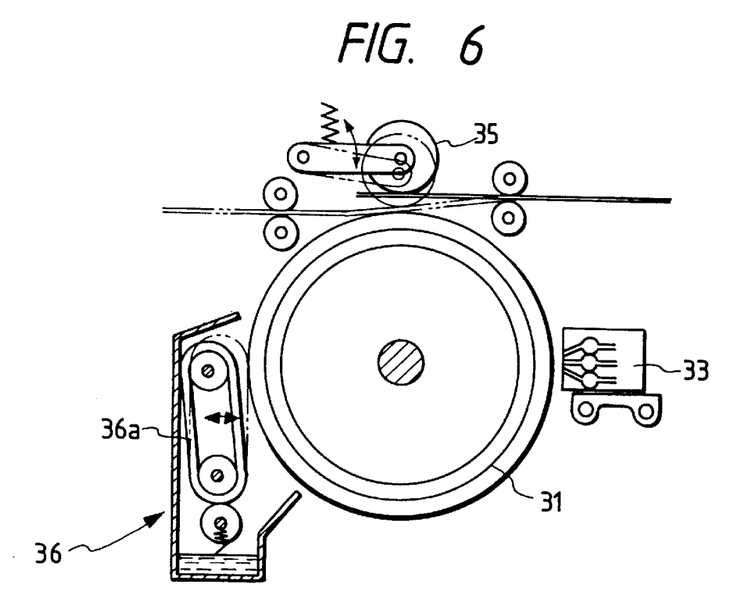
FIG. 6 illustrates a sixth embodiment of the present invention.

The sixth embodiment illustrated in FIG. 6 is constructed so that ink is transferred after batch processing, that is, after one full page of writing to the transfer drum 31, and ink condensing has been accomplished. The transfer drum 31 is formed so its surface is at least as large as one page of A3-size paper. The fixing roller 35 and the solvent recovery belt 36a provided around the transfer drum 31 are constructed so that they are separated from the surface of the transfer drum 31 during a writing operation of recording head 33.

In this embodiment, vibration and load caused by the contact of the fixing roller 35 and the solvent recovery belt 36a do not affect the transfer drum 31 during the writing operation. Accordingly, there is no positional shifting of dots, so that more accurate recording image writing and transferring can be made. After the writing operation is complete, fixing roller 35 and solvent recovery belt 36a are pivoted so as to be pressed against transfer drum 31 for a transfer operation.

Though not shown, the inside pressure of the transfer drum 31 may be set to a negative value by a blower to make the absorption of a solvent more effective. Furthermore, the moisture level of the surface of the transfer drum 31 can be kept constant by adjusting the inside pressure thereof.

Figure 7:
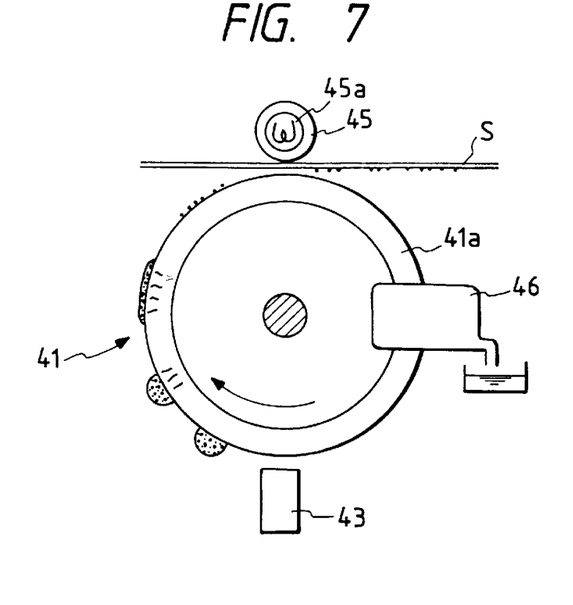
FIG. 7 illustrates a seventh embodiment of the present invention.

FIG. 7 illustrates a seventh embodiment of the present invention which is adapted for condensing ink formed by a dispersing toner composed of pigment and resin in silicone oil.

A polytetrafluoroethylene filter layer 41a having a smaller mesh size than the diameter of toner is laminated on the transfer drum 41. A solvent recovering unit 46, similar to that of the fifth embodiment, is provided in the downstream side of the transfer drum 41 with respect to the fixing roller 45, so that silicone oil absorbed into the polytetrafluoroethylene filter layer 41a is recovered after transfer and toner, which has been condensed, is fixed onto the recording medium S while the recording medium S is heated to about 160° C. by the heater 45a-inside fixing roller 45.

In this embodiment, the polytetrafluoroethylene filter 41a in the transfer drum 41 may be replaced by silicone rubber which swells as it absorbs a petroleum solvent. Silicone rubber is very high in absorption speed, so that ink can be condensed rapidly when ink drops are ejected onto silicone rubber.

The embodiments illustrated in FIGS. 8 through 13 are adapted to ink formed by dispersing electrically charged coloring fine particles in a petroleum solvent. Particularly, the embodiments are constructed so that the transfer function and the solvent absorbing function are respectively assigned to separate members.

Figure 8:
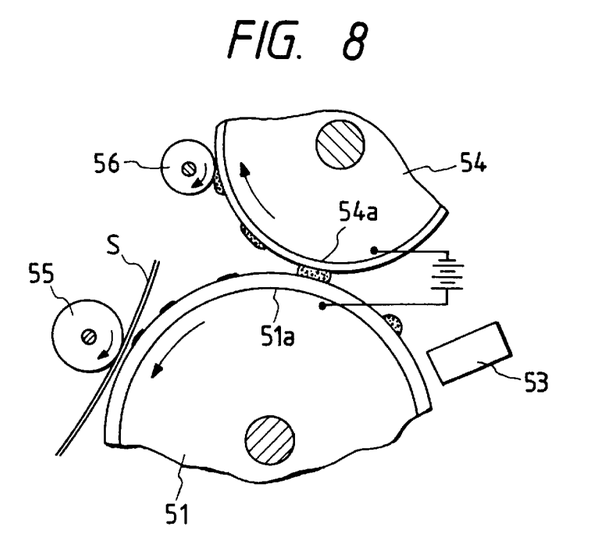
FIG. 8 illustrates an eighth embodiment of the present invention.

In the eighth embodiment of the present invention illustrated in FIG. 8, transfer drum 51, which is moved in a similar manner as the first embodiment, has a surface formed from a suitable dielectric layer 51a. A solvent absorption roller 54 has a dielectric layer 54a formed on a surface thereof. The dielectric layer 54a has good wetting properties with respect to a petroleum solvent. The absorption roller 54 is positioned between a recording head 53 and a fixing roller 55 so as to be rotated in close proximity to the transfer drum 51. A voltage having a polarity opposite to the polarity of the electrically charged coloring fine particles is applied to the transfer drum 51 and a voltage having a polarity opposite to the polarity of the voltage applied to the transfer drum 51 is applied to the solvent absorption roller 54, so that ink is concentrated by transferring a solvent from the transfer drum 51 to the solvent absorption roller 54 while holding the charged coloring fine particles dissolved in a solvent on the transfer drum 51 through the electric field effect therebetween.

A cleaner 56 is provided for removing a solvent absorbed onto the solvent absorption roller 54. Cleaner 56 operates in a manner similar to the cleaner 36 described in previous embodiments.

In the eighth embodiment, when charged coloring particles, together with a solvent, are ejected from the ink jet recording head 53, the solvent absorption roller 54, rotating in proximity of the transfer drum 51 on the downstream side of the recording head 53, transfers solvent to dielectric layer 54a on the surface of the roller 54 while the charged coloring particles remain on the transfer drum 52 by the electric field effect due to the opposing change between the particles and the absorption roller 54. As a result, after the pigment concentration of the ink on the transfer drum 51 is increased, the ink is transferred onto the recording medium S.

This embodiment has an advantage in that not only can a solvent be securely separated from charged coloring fine particles but ink can be condensed without reduction of speed, change in temperature or other steps.

Figure 9:
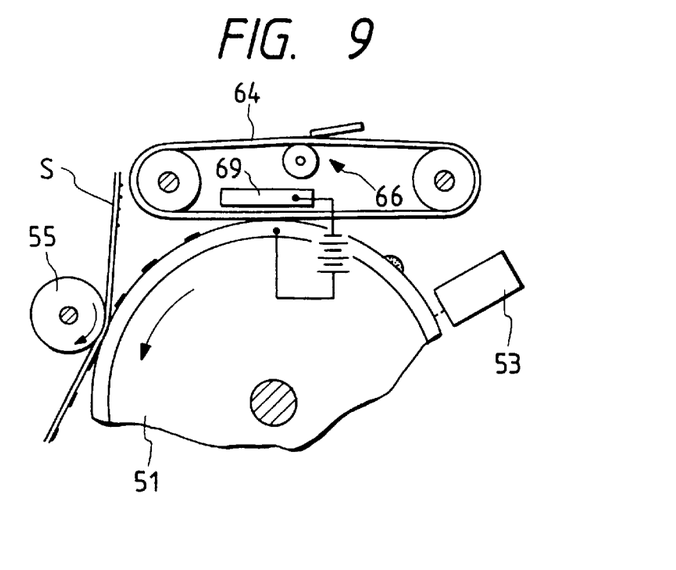
FIG. 9 illustrates a ninth embodiment of the present invention.

In the ninth embodiment of the present invention, illustrated in FIG. 9, a solvent recovery belt 64, formed from an insulating thin film which has a good wetting property with respect to a petroleum solvent, is stretched so that it moves while touching the transfer drum 51 at a position downstream of the recording head 53. Also, a fixed electrode 69 is provided in the back of the solvent recovery belt 64 so as to be in opposition to the transfer drum 51. The electrode 69 has a charge thereon with a polarity opposite to that of the coloring particles. A cleaner unit 66 is also provided for removing a solvent transferred to the belt 64 in a manner similar to previous embodiments.

This embodiment has an advantage in that solvent can be transferred effectively without disturbance of the recording image because the solvent recovery belt 64 contacts the transfer drum 51 with a very low line pressure. Of course, the coloring particles will remain on the transfer drum 51 due to the electric field between transfer drum 51 and electrode 69.

Figure 10:
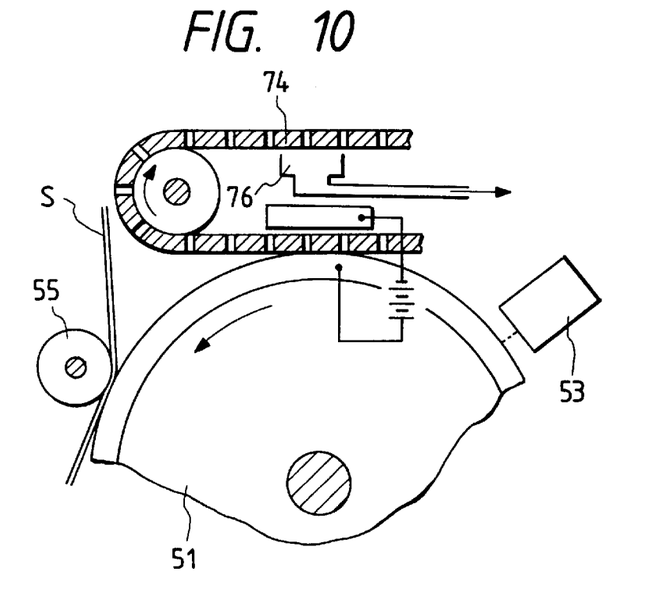
FIG. 10 illustrates a tenth embodiment of the present invention.

In the tenth embodiment of the present invention illustrated in FIG. 10, a solvent recovery belt 74 is brought in contact with the transfer drum 51. The solvent recovery belt 74 is formed from an insulating mesh film and, at the same time, a suction chamber 76, in communication with a blower (not shown), is provided in the back of the belt 74 so as to be in close proximity thereof.

This embodiment has an advantage in that the absorption ability of the solvent recovery belt 74 can be retrieved more completely because a solvent can be effectively recovered/removed from the solvent recovery belt 74 due to suction generated by the blower.

Figure 11:
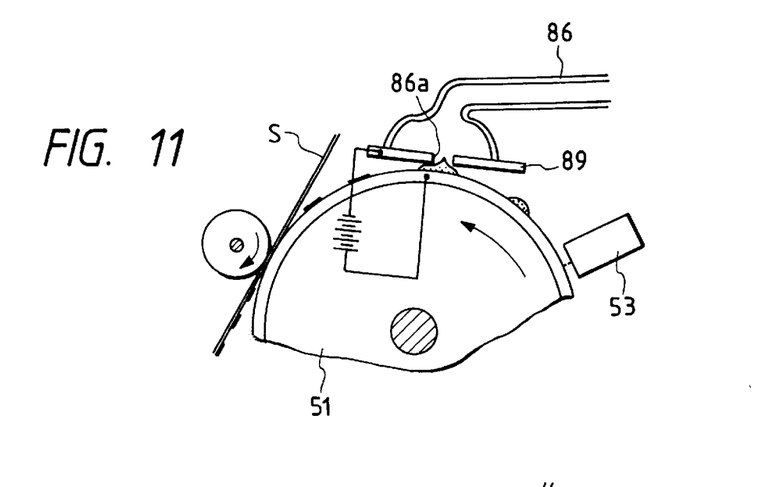
FIG. 11 illustrates an eleventh embodiment of the present invention.

In the eleventh embodiment of the present invention, illustrated in FIG. 11, a solvent is directly sucked/removed from the surface of the transfer drum 51 so that a solvent recovery belt is unnecessary.

That is, in this embodiment, an electrode plate 89 is provided on the downstream side of the recording head 53 so as to be in opposition to the transfer drum 51. A large number of solvent suction holes 86a are provided in the electrode plate 89 so as to communicate with a solvent suction duct 86 connected to a solvent recovery tank (not shown) through a blower (not shown). Accordingly, the solvent can be removed from transfer drum 51 by suction and the particles in the ink will remain on transfer drum 51 in a condensed manner.

Figure 12:
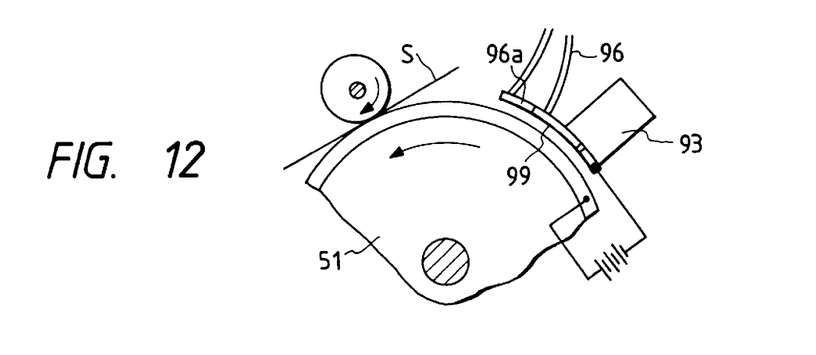
FIG. 12 illustrates a twelfth embodiment of the present invention.

In the twelfth embodiment, illustrated in FIG. 12, a nozzle plate of a recording head 93 is formed integrally with an electrode plate 99 and a solvent suction duct 96 is provided in the downstream side of the electrode plate 99 with respect to the recording head 93 so as to communicate with solvent suction holes 96a and a solvent recovery tank. This embodiment has an advantage in that a solvent can be reliably recovered because the positional relation between the nozzle for ejecting ink drops and the suction holes for recovering a solvent is precise. Otherwise operation of this embodiment is similar to the eleventh embodiment.

Figure 13:
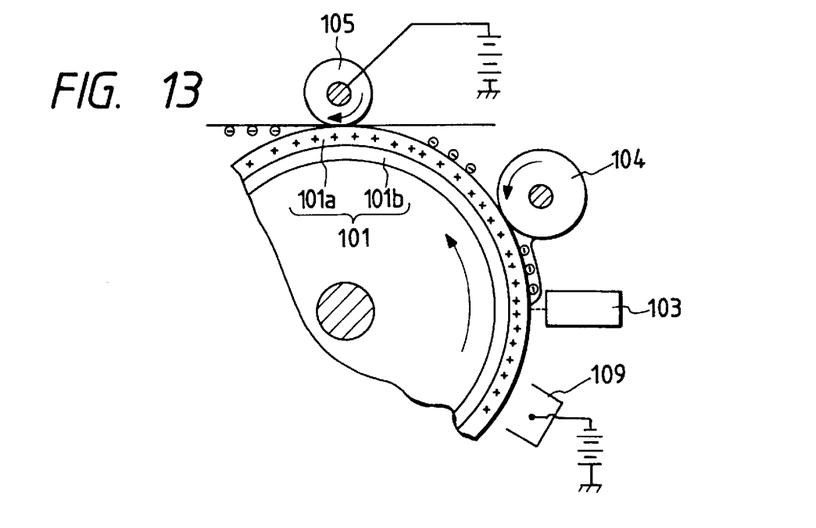
FIG. 13 illustrates a thirteenth embodiment of the present invention.

In the thirteenth embodiment, illustrated in FIG. 13, a transfer drum 101 is formed by laminating a photoconductive layer 101a on an electrical conductive layer 101b. The entire surface of the photoconductive layer 101a is charged by a corotron 109 provided in the upstream side of the recording head 103, so that coloring charged fine particles ejected together with a solvent from the recording head 103 are electrostatically attracted to the transfer drum 101. A solvent recovery roller 104 provided in the downstream side of the recording head 103 is rotated in proximity of the transfer drum 101 to recover/remove a solvent from the transfer drum 101 (in a manner similar to previous embodiments), so that coloring charged fine particles in a solvent can be condensed.

Though not shown, an antistatic lamp is provided in the downstream side of the fixing roller 105 to remove charge from the surface of transfer drum 101. Although the embodiment utilizes a photoconductive layer 101a, the same effect can be attained in the case where a dielectric layer is provided.

Furthermore, the embodiments describe above can all be applied to the case where a drum type transfer medium or an endless belt type transfer medium is used. In addition, the individual elements of the various embodiments can be combined as is appropriate.

The subject invention has been described through preferred embodiments thereof. However, it will be apparent to those skilled in the art that various modifications can be made without departing from the scope of the invention as defined by the appended claims.

What is claimed:

1. A transfer printing apparatus comprising:

recording image writing means for writing an image, by projecting liquid ink including a dispersion medium and a coloring material, corresponding to recording information;

a recording image transfer medium disposed proximately to said writing means so as to receive directly from said recording image writing means said ink and transfer said image onto a recording medium;

a moving unit for moving said recording image transfer medium with respect to said writing means;

dispersion medium absorption means for removing by absorption said dispersion medium from said ink received on said recording image transfer medium without removing is said coloring material, said dispersion medium absorption means being disposed in a downstream direction of movement of said recording image transfer medium with respect to said writing means, and adjacent to said writing means, wherein said dispersion medium absorption means does not contact said recording image transfer medium; and recording image fixing means for forcedly pressing the recording medium against said recording image transfer medium, said fixing means being disposed at a position which is in a downstream direction with respect to said dispersion medium absorption means.

2. A transfer printing apparatus according to claim 1, wherein said coloring material includes a plurality of charged pigment particles having a charged polarity, said recording image transfer medium is formed from a dielectric material electrically charged to electrostatically attract said plurality of charged pigment particles.

3. A transfer printing apparatus according to claim 2, wherein said dispersion medium absorption means is constituted by a solvent absorption member formed from a dielectric material having wetting properties with respect to an oil solvent.

4. A transfer printing apparatus according to claim 2, further comprising:

means for applying a plurality of voltages, including a first voltage, having a polarity opposite to the charged polarity of said particles, applied to said recording image transfer medium and a second voltage, having a polarity opposite to the polarity of said first voltage, applied to said dispersion medium absorption means.

5. A transfer printing apparatus according to claim 3, further comprising:

means for applying a plurality of voltages, including a first voltage, having a polarity opposite to the charged polarity of said particles, applied to said recording image transfer medium and a second voltage, having a polarity opposite to the polarity of said first voltage, applied to said dispersion medium absorption means.

6. A transfer printing apparatus according to claim 1, wherein said dispersion medium absorption means is constituted by a solvent absorption member formed from a dielectric material having wetting properties with respect to an oil solvent.

7. A transfer printing apparatus according to claim 1, further comprising:

means for applying a plurality of voltages, including a first voltage, having a polarity opposite to a charged polarity of said particles, applied to said recording image transfer medium and a second voltage, having a polarity opposite to the polarity of said first voltage, applied to said dispersion medium absorption means.

8. A transfer printing apparatus according to claim 6, further comprising:

means for applying a plurality of voltages, including a first voltage, having a polarity opposite to a charged polarity of said particles, applied to said recording image transfer medium and a second voltage, having a polarity opposite to the polarity of said first voltage, applied to said dispersion medium absorption means.

9. A transfer printing apparatus according to claim 1, wherein said dispersion medium absorption means is a meshed member, said apparatus further comprising a suction means provided between said recording image writing means and said recording image fixing means for removing said dispersion medium from a back surface of said dispersion medium absorption means by absorbing said dispersion medium by suction.

10. A transfer printing apparatus according to claim 1, wherein said dispersion medium absorption means comprises:

suction means provided between said recording image writing means and said recording image fixing means for removing said dispersion medium from a front surface of said recording image transfer medium by absorbing said dispersion medium by suction.

11. A transfer printing apparatus according to claim 1, wherein said recording image writing means is an ink jet recording head.

12. A transfer printing apparatus comprising:

means for writing an image, corresponding to recording information, by projecting liquid ink including a dispersion medium and a coloring material;

a recording image transfer medium receiving, directly from said means for writing an image, said projected liquid ink corresponding to said image written by said means for writing an image;

means, disposed adjacent to said writing means, for removing by absorption said dispersion medium from the ink in said image without removing said coloring material, wherein said means disposed adjacent to said writing means does not contact said recording image transfer medium; and means for transferring said ink in said recording image with the dispersion medium removed therefrom to a recording medium.

13. A transfer printing apparatus according to claim 12, wherein said means for writing an image is an ink jet recording head.

14. A transfer printing apparatus comprising:

recording image writing means for writing an image, by projecting liquid ink including a dispersion medium and a coloring material, corresponding to recording information;

a recording image transfer medium disposed proximately to said writing means so as to receive directly from said recording image writing means said ink as a dot and transferring said image onto a recording medium;

a moving unit for moving said recording image transfer medium with respect to said writing means;

dispersion medium absorption means for removing by absorption said dispersion medium from said ink received on said recording image transfer medium without removing said coloring material, said dispersion medium absorption means being disposed in a downstream direction of movement of said recording image transfer medium with respect to said writing means, and adjacent to said writing means, wherein said dispersion medium absorption means does not contact said recording image transfer medium; and recording image fixing means for forcedly pressing the recording medium against said recording image transfer medium, said fixing means being disposed at a position which is in a downstream direction with respect to said dispersion medium absorption means.

* * * * *